United States Patent [19]

Tsipov

[11] Patent Number: 4,822,239
[45] Date of Patent: Apr. 18, 1989

[54] VERTICAL AXIS WINDMILL

[76] Inventor: Michael E. Tsipov, 120 Ruth Ellen, Richmond Heights, Ohio 44143

[21] Appl. No.: 194,088

[22] Filed: May 13, 1988

[51] Int. Cl.[4] ................................................. F03D 3/04
[52] U.S. Cl. ........................................ 415/2 R; 415/3; 416/117
[58] Field of Search ............................... 415/2 R–4 R; 416/117 R, 117 B

[56] References Cited

U.S. PATENT DOCUMENTS

| | | | |
|---|---|---|---|
| 43,663 | 8/1864 | Barton | 415/4 R X |
| 185,924 | 1/1877 | Howland et al. | 416/117 |
| 330,168 | 11/1885 | Tallerday | 416/132 B |
| 478,945 | 7/1892 | Rouse . | |
| 783,036 | 2/1905 | Gould | 416/117 |
| 1,036,128 | 8/1912 | Mahoney | 415/2 R X |
| 1,148,989 | 8/1915 | Reese | 416/117 B |
| 1,562,506 | 11/1925 | Jenkins | 415/2 R X |
| 1,915,689 | 6/1933 | Moore | 416/117 |
| 1,963,196 | 6/1934 | Frisch | 415/2 R X |
| 2,441,635 | 6/1945 | Iverson | 416/117 |
| 4,057,270 | 11/1977 | Lebost | 415/2 A X |
| 4,087,202 | 2/1978 | Musgrove | 416/41 |
| 4,116,585 | 9/1978 | Maracic | 416/41 |
| 4,132,282 | 1/1979 | Sparks | 415/2 R X |
| 4,234,289 | 11/1980 | Lebost | 415/2 R |
| 4,289,444 | 9/1981 | Monk et al. | 415/3 R |
| 4,295,783 | 10/1981 | Lebost | 415/2 R |
| 4,521,154 | 6/1985 | Corbett | 416/175 |
| 4,686,376 | 8/1987 | Retz | 415/2 R X |

OTHER PUBLICATIONS

Wind Machines, Repert Prepared for National Science Foundation, U.S. Government Printing Office Stock Number 038-000-00272-4.

Primary Examiner—Everette A. Powell, Jr.
Attorney, Agent, or Firm—Woodrow W. Ban

[57] ABSTRACT

A vertical axis windmill wherein the blades pivot between a power delivery and a recovery position with air gates associated with a non-rotating chamber containing the windmill acting to preclude airflow over the blades while in the recovery position. The blades either include chambers therein configured to receive a fluid moveable between the chambers as dictated by rotational speed of the windmill, or the blades are connected in pairs with elevational motion of one blade to a power delivery position assists the other blade of the pair in returning from the power delivery position to the recovery position.

12 Claims, 3 Drawing Sheets

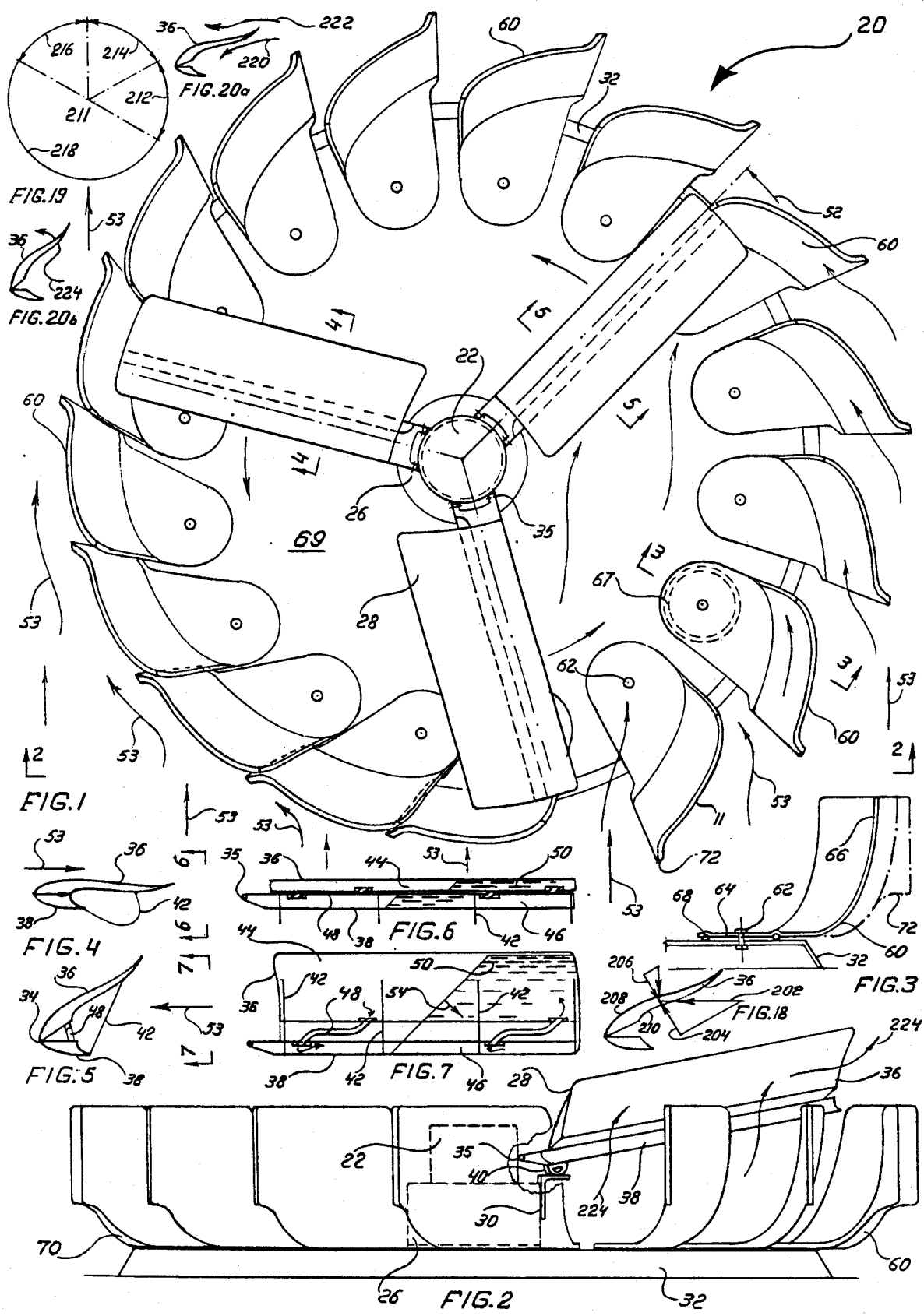

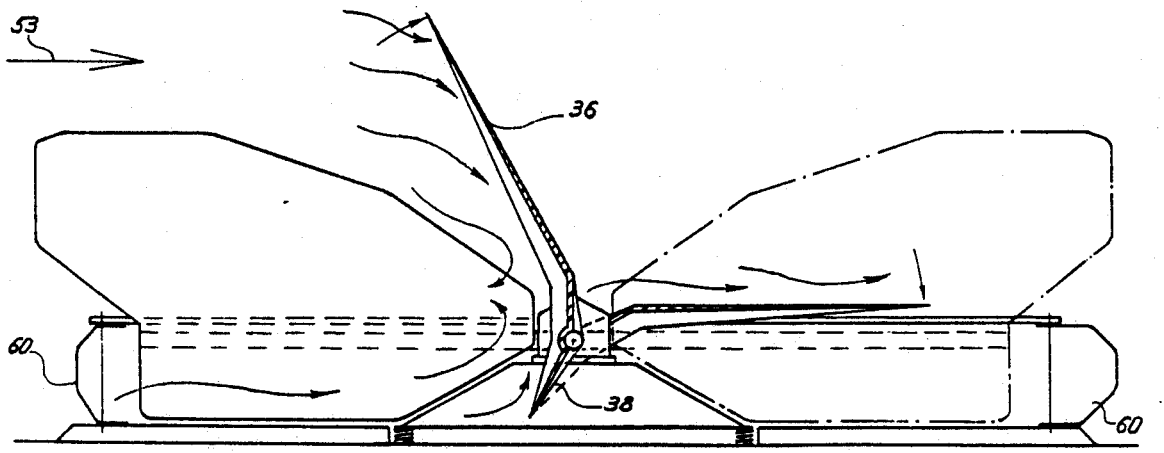
FIG. 16
FIG. 17
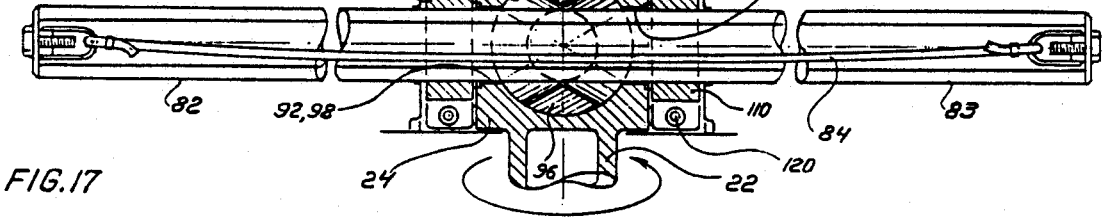
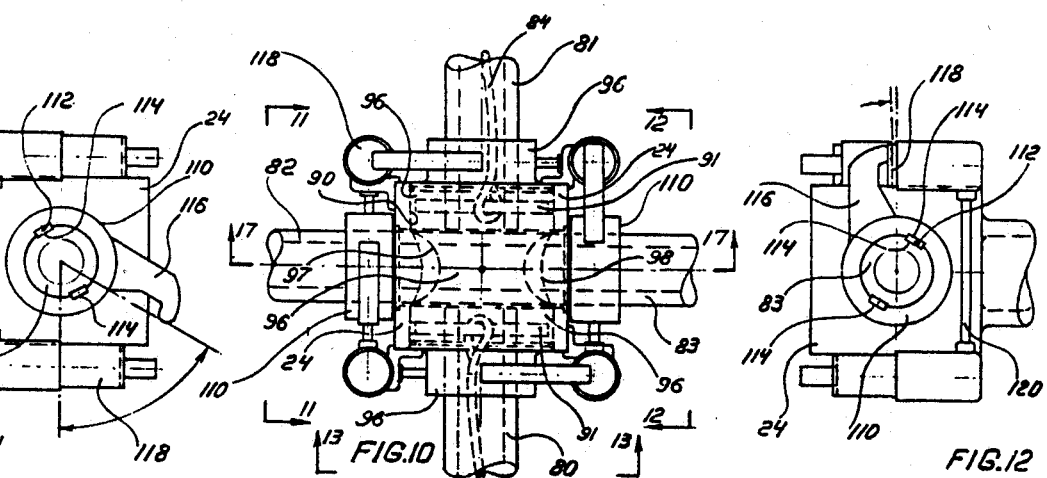
FIG. 11    FIG. 10    FIG. 12
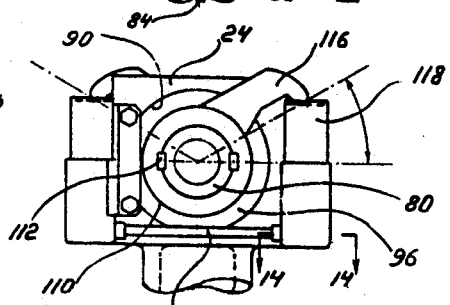
FIG. 15    FIG. 13
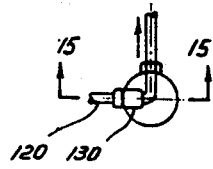
FIG. 14

VERTICAL AXIS WINDMILL

FIELD OF THE INVENTION

This invention relates to devices for capturing the power of the wind, and more particularly to such devices wherein wind power is converted to rotational mechanical energy. More particularly, this invention relates to windmills and more specifically to windmills having an axis of rotation oriented generally perpendicularly with respect to the surface of the earth, or so-called vertical axis windmills.

BACKGROUND OF THE INVENTION

Windmills are not new. From at least the end of the dark ages in Europe, the wind has been employed in certain countries, notably Holland, to perform useful functions such as the pumping of water for purposes of clearing flooded or floodable land. These early windmills traditionally have been possessed of a certain timelessness in design, and have been captured by some of the great masters in paintings hanging in the finest museums.

While such early windmills typically were directly coupled to a power consuming device such as a water pump, more recently windmills have been coupled to devices configured for generating power in a transmittable form, such as electricity. The basic configuration of windmills has changed over time also. Gone for the most part are the quaint buildings housing the works of a windmill such as captured the fancy of certain great painters of the past. In their place stand spidery towers supporting aerodynamically efficient blades. Often the blades are capable of being positioned with respect to the towers so that as the direction from which the wind approaches the tower changes, the blades may be oriented to face the approaching wind at an angle most favorable to the extraction of energy from the approaching wind.

One factor appears to have remained dominant in the evolution of successful windmill designs, however. That factor would appear to be the orientation of the axis of rotation for the blades of the windmill. With few exceptions, this axis generally uniformly parallels the direction of wind motion across the windmill. As this direction of wind motion typically is also generally parallel to the surface of the Earth, these wind machines have become known as horizontal axis windmills as the axis of rotation of the blades most typically is horizontal to the surface of the Earth.

The use of a vertical axis in the construction of windmills has been attempted, but with the possible exception of the so-called Darrieus type windmills and their derivatives, these vertical axis windmills have provided generally less than satisfactory commercial performance. And Darrieus type windmills traditionally require a substantial vertical structure to support the windmill. Thus these vertical axis windmills have been characterized by massive vertical structures and substantial height requirements for use.

A general, survey-type reference on windmill designs may be found in a report prepared for the National Science Foundation by Frank R. Eldridge of the Mitre Corporation under Grant No. AER-75-12937 in 1975. This report may be obtained from the Superintendent of Documents, United States Government Printing Office under stock number 038-000-00272-4.

While one prime focus in the use of windmills has been upon the generation of electrical power, other uses are possible where the windmill can be of a size, configuration and orientation suitable for application to a particular use. For example, in modern buildings with high ceilings it is often useful to employ ceiling fans to assist in the movement of air about the building to reduce the stratification of air into thermal layers within the building and the accompanying inefficiencies in heating and cooling. While these ceiling fans are most typically powered by electrical motors, they could as easily be powered by a rooftop mounted windmill having a rotational shaft configured to penetrate the roof to drive the fan.

But many building owners may object to the presence of typical tall spidery horizontal axis windmill structures upon their building as being at the least ungraceful, as well as likely imposing difficult structural loading problems in supporting these towers against the forces applied thereagainst by the movement of wind during violent storms. While blades characterizing many windmill designs may be feathered to reduce resistance to wind passage, the tower structure supporting the blades in many windmills poses a wind resistance which cannot easily be feathered.

Accordingly, a vertical axis windmill having a desirably low profile and yet an efficient mode of operation that could be used upon rooftops without unduly detracting from the appearance of the building embodying the windmill could find substantial use in commerce. Where such a windmill can generate additionally a sufficient torque to drive an electrical generating device, such windmills could have substantially enhanced utility in commerce.

During periods of violent weather windmills are vulnerable to damage due to the excessive forces imposed upon the windmill blades by the violent weather. Various proposals have been put forward for reducing this tendency for damage. Some have provided means for feathering the blades; others have provided means for governing the ultimate speed of rotation for the windmill or have allowed free rotation of the windmill blades while limiting or discontinuing power transfer to power consuming devices attached to the windmill during times that wind velocities are excessive to avoid thereby damage to power consuming devices. Such devices in the past have tended to be somewhat bulky, prone to less than reliable operation or incapable of protecting the windmill itself from damage from excessive wind velocity.

A windmill having a self governing feature to limit rotational velocity or power transfer during violent weather could find considerable application in commerce.

SUMMARY OF THE INVENTION

The present invention provides a windmill having a vertical axis of rotation with respect to the Earth's surface. The vertical axis is defined by a power transfer shaft. A plurality of blades are attached to the power transfer shaft in a power transferring configuration. The blades are configured, in addition, to pivot between a power delivery position and a recovery position about an axis generally perpendicular to the vertical axis defined by the power transfer shaft.

A non-rotating central housing is provided configured to establish an outer pheriphery surrounding the power transfer shaft and blades, thereby defining a plenum. A plurality of airgates are provided; the airgates are configured and attached to the central housing in a manner permitting pivoting action between a closed position allowing only negligible airflow through the airgate to the central housing and an open position allowing non-negligible air flow to the central housing. The airgates further include an air dam portion configured to facilitate movement of the airgates from the closed to the open position under the impetus of a desired airflow.

The blades each include an upper and a lower portion with respect to the Earth's gravitation field, the upper blade portion being larger than the lower blade portion in terms of surface area. The blades additionally are configured whereby, while the blade is positioned in the power delivery position, the lower blade portion thereof is configured and positioned to: (i) collect air flow entering the central housing through the airgates; and (ii) channel the airflow towards the axis upon which the blade pivots. The upper blade portion conversely is configured and positioned to: (i) collect air flow entering the central housing through the airgates and passing over the windmill outside the central housing; and (ii) channel the air flow so collected towards the axis upon which the blade pivots. The blade, while in the power delivery position thereby defines and presents a generally concave surface to air flow passing both through the airgates and over the central housing.

The blades are further configured whereby while the blade is positioned in the recovery position, the blade is configured to present a generally convex surface to air flow which may be present both within the central housing and flowing thereover, the upper and lower portions being configured and positioned to conduct airflow generally away from the axis along which the blade pivots.

In one preferred embodiment, each blade includes one, and preferably two fluid chambers, and contains in the fluid chambers a quantity of fluid sufficient to fill partially the chambers. Where a pair of fluid chambers are employed, the chambers are joined by at least one fluid conduit configured to pass the fluid between the chambers. Preferably where a pair of chambers are employed, one is provided in each of the upper and lower portions of each particular blade. On each blade at least one of the upper or lower portions is configured for pivoting motion along the blade pivot axis, with respect to the other, thereby defining and establishing the pivoting motion of the blade, and in addition includes a means for limiting the extent of pivoting motion of the blade portions one with respect to the other.

In alternate preferred embodiments, the blades are associated in pairs, with the blades of each pair being positioned rotationally 180° apart in a plane established by the rotation of the windmill. The blades of the pairs are interconnected whereby movement of a blade in a pair from the recovery position to the power delivery position applies a returning force to the other blade in the pair configured to assist said other blade in returning from a power delivery position to the recovery position. Typically the interconnection is formed by a coupling joining the blades within each pair.

The coupling includes a block having two bores therethrough configured to receive and accommodate shafting joining the blades of each of the pairs. Blades in one pair are affixed to a shaft formed of two shaft portions joined by a bushing passing through the coupling block and having a bore therethrough of a size and configuration for receiving a second shaft. A second shaft is provided to which the other pair of blades is affixed, passing through the bore in the first shaft bushing.

Along each shaft a pair of engagement elements are provided affixed adjacent to the block on either side thereof and associated one with each of the blades of the pair joined by the shaft. A power delivery piston is provided in conjunction with each engagement element and the power delivery piston is configured to engage a respective engagement element whereby upon rotation of a blade from the recovery position to the power delivery position, the engagement element activates the power delivery piston. A fluid interconnection is provided configured to provide a fluid displaced by activation of the power delivery piston associated with motion of a particular blade to the power delivery piston, to the next foremost blade in the direction of rotation of the windmill, whereby the power delivery piston associated with said next foremost blade is caused to move the engagement element associated with that next foremost blade in a manner assisting that next foremost blade in motion from the power delivery position to the recovery position. Check valves are provided to assure against fluid motion to the power delivery piston next rearmost in the direction of rotation of the windmill.

The above and other features and advantages of the invention will become more apparent when considered in light of a description of a preferred embodiment of the invention together with a drawing in multiple figures, which follow forming a part of the specification.

DESCRIPTION OF THE DRAWING

FIG. 1 is a depiction of a plan view of a windmill made in accordance with the invention.

FIG. 2 is an edge view of the windmill of FIG. 1.

FIG. 3 is a representation of an airgate for use on a windmill in accordance with the invention.

FIG. 4 is a representation of a blade in recovery position configured for use in the windmill of FIG. 1.

FIG. 5 is a representation of the blade of FIG. 4 in a power delivery position.

FIG. 6 is a representation of fluid chambers associated with the blade of FIG. 4.

FIG. 7 is a representation of fluid chambers associated with the blade of FIG. 5.

FIG. 10 is a depiction of a connector block suitable for use in the windmill of FIG. 8.

FIG. 11 is a view along lines 11—11 in FIG. 10.

FIG. 12 is a view along lines 12—12 in FIG. 10.

FIG. 13 is a view along lines 13—13 in FIG. 10.

FIG. 14 is a view along lines 14—14 in FIG. 13.

FIG. 15 is a representation in section of a check valve suitable for use in the windmill of FIG. 8.

FIG. 16 is a representation of the windmill of FIG. 8 in partial section along lines 16—16.

FIG. 17 is a representation of the block of FIG. 10 taken along line 17—17.

FIG. 18 is a representation of forces impacting upon a blade in the practice of the invention.

FIG. 19 is a representation of the action of the blade during rotation about the windmill.

FIG. 20a is a representation of windflow during vertical lifting of the blade.

FIG. 20b is a representation of windflow during horizontal lifting of the blade.

BEST EMBODIMENT OF THE INVENTION

Figures 8, 9:
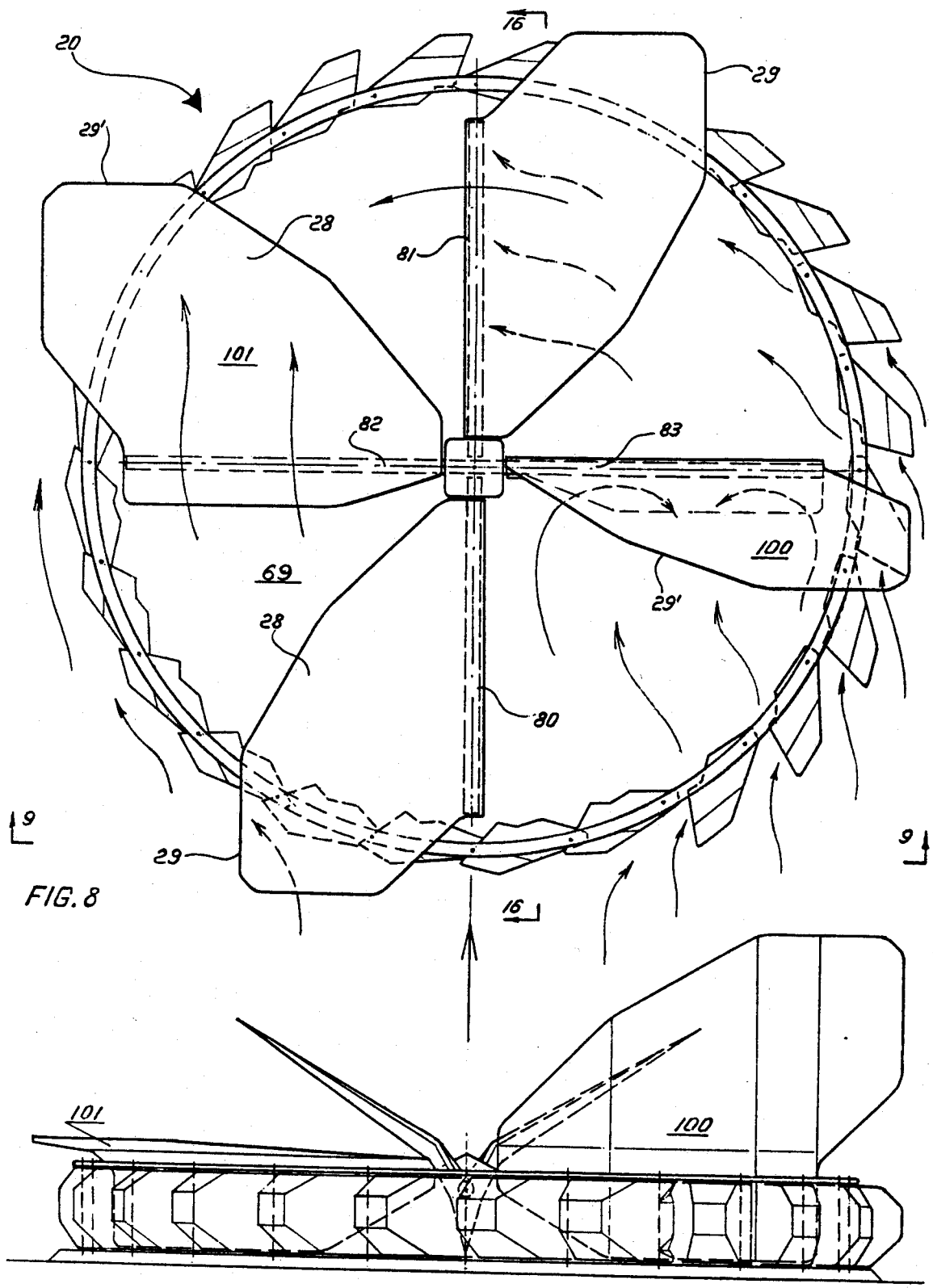
FIG. 8 is a plan view of an alternate embodiment of a windmill in accordance with the invention.
FIG. 9 is an edge view of the windmill of FIG. 8 in partial section along line 9—9.

Referring to the drawing, FIGS. 1 and 2 depict a windmill 20 in accordance with the invention. A power transfer shaft 22 formed of pipe, tubing, or the like is provided in conjunction with the windmill 20. The power transfer shaft 22 carries a collar 26 which may include therein a generator mechanism (not shown) and gearing therefor (not shown) in conventional manner. A plurality of blades 28 are attached to shaft 22 and supported by the collar 26. The attachment between the shaft 22 and the blades 28 may be of any suitable or conventional nature such as by bolting or welding employing a mounting plate 30 and hinges 35 or the like. The collar 26 is configured to support the shaft 22 is suitable or conventional manner.

A base 32 is provided. The base 32 can be configured to any desired physical form, and can be tailored to include mounting feet, flanges, fittings and the like whereby the base 32 can be attached to an object such as a roof, tower, or other structure to which it is desired that the windmill 20 be affixed. In recognition thereof, the base 32 as depicted in FIG. 2 is a generic base intended to represent the modifications thereto reasonably occurring to one skilled in the art when attempting to affix the windmill 20 of the invention to an object.

The power transfer shaft 22 is attached to the base 32. The attachment can be accomplished in any of a large number of well known ways such as through the use of bushings or bearings in the form of the collar 26 or the like. Accordingly a particular attachment means has not been depicted in detail in the embodiment shown in FIGS. 1 and 2 as the details of such attachment are well within the knowledge of one skilled in the art.

Each blade 28 includes a hinge portion 34. The hinge portion 34 functions to separate each blade 28 into an upper 36 and a lower 38 portion. The lower portion 38 is supported by the bracket 30 employing a bumper 40 formed of rubber or other elastomer. The bumper 40 is not essential, and the lower portion 38 can be supported directly by the bracket 30 if desired.

Referring to the drawing, FIGS. 4 and 5 depict the blade portions 36, 38. The upper blade portion 36 is free to pivot about the hinge 34 with respect to the lower blade portion 38 which is fixed by reason of attachment to the shaft 22. Rotation of the upper blade portion 36 in pivoting about the hinge 34 is limited by a travel limiter 42. The travel limiter 42 in the embodiment of FIGS. 4 and 5 is simply a wire or wires having sufficient strength to withstand the forces generated by wind pressure against the upper blade portion 36 as the windmill 20 rotates, but may be other suitable or well known restraining means such as straps or positive rotational limitors or stops on the hinge 34.

Referring to the drawing, FIGS. 6 and 7 depict a plurality of chambers 44, 46. The chamber 44 is formed within the upper blade portion 36 while the remaining chamber 46 is formed in the lower blade portion 38. The chambers are configured to receive a fluid 50. The chambers 44, 46 are joined in fluid communication by a passageway 48. The passageway can be hosing, tubing, flexible pipe or the like, provided that the passageway 48 can accommodate without an undue failure rate the repeated flexing associated with pivoting motion of the upper blade portion 36. In the embodiment of FIGS. 6 and 7, the passageway 48 is made from rubber tubing.

The positioning of the blade portions 36, 38 in FIG. 4 depicts a recovery position for the blade 28 in the windmill 20. The positioning of the blade portions in FIG. 5 depicts a power delivery position for the blade 28 as the blades 28 rotate in a direction shown generally by an arrow 52 in FIG. 1. In FIGS. 4 and 5 the direction of the wind driving the windmill is depicted by an arrow designated 53. It may be seen in referring to FIGS. 4 and 5 that in the recovery position of FIG. 4, the blade 28 presents a convex profile to the wind impinging upon the windmill. In FIG. 5, the power delivery position, the blade 28 presents a generally concave profile to wind impinging upon the blade 28. In FIG. 5, impinging wind is collected by the lower blade portion 38 and directed towards the hinge 34 while wind impinging the upper blade portion 36 is directed towards the hinge 34 also thereby creating a zone of elevated pressure adjacent the hinge which functions to drive the windmill 20 in the direction of the arrow 52.

It may be desirable to provide the bracket 30 with a capability for being aligned in somewhat different mounting positions with respect to the collar. Such a variable mounting capability can be useful for adjusting the windmill 20 in accommodating a variety of wind conditions. Particularly, it may be desirable to "cock" the blades and thereby cause the lower blade portion 38 to capture and direct towards the hinge 34 more or less wind depending upon the prevailing local strength of the wind.

The chambers 44, 46 are not essential to the functioning of the windmill 20, but may enhance the operation of the windmill, particularly in providing a governing or limiting function with respect to rotational speed of the windmill 20. It may be seen in referring to FIGS. 6 and 7 that rotational speed applies a centrifugal force to the fluid 50 in the chambers 44, 46. This force tends to cause the fluid to move outwardly within the chambers 44, 46 towards the end of the blade 28. Where free fluid intercommunication exists between the blade portions 36, 38 of a particular blade 28, with the windmill at rest the fluid will tend to accumulate in and fill the chamber 46. As rotational speed of the windmill 20 increases, the fluid 50, under centrifugal force, moves outwardly towards the end of the blade 28 via the passageway 48 tends to fill a portion of the upper chamber 44 while vacating the lower chamber 46. Movement of the fluid, of course, is. The weight of the fluid 50 tends to counterbalance this tendency to fill the upper chamber 44. At a particular rotational speed for the windmill 20, an equilibrium may be reached resembling the depiction of FIGS. 6 and 7 wherein the centrifugal forces acting upon the fluid 50 are counterbalanced by a force line 54 representing the weight of the fluid 50 to establish a distribution of the fluid between the upper 44 and lower 46 chambers. As rotational speed increases more fluid will tend towards the ends of the blades 28 and more will tend to be in the upper chamber 44.

The presence of a greater proportion of the fluid 50 in the upper chamber 44 will tend to make the upper blade portion 36 heavier and therefore more difficult for the wind to lift to the power delivery position. By limiting the extent to which the upper blade lifts, the extend to which the power of the wind can be captured is thereby limited. With the proper selection of a fluid 50 having desirably density properties, it is conceivable that the upper blade portion 36 can be made to remain substantially closed during elevated winds tending to product extremely rapid windmill 20 rotation, and thereby limit the ultimate speed at which the windmill 20 rotates and the potential for damage to the blades 28 at one and the same time. Conversely, in light winds, much if not all of the fluid 50 will be present in the lower chamber 46 and the upper blade portion 36, thereby lightened, may be lifted by the light wind to the greatest possible extent thereby capturing as great a proportion of the light winds as can be accommodate by the configuration of the blades 28.

The base 32 includes affixed thereto a plurality of airgates 60. The airgates 60, shown best in FIG. 3, are attached to the base 32 employing suitable or conventional rotational means such as a pin or rivet 62. The airgate 60 is configured in the form of a base portion 64 through which the pin or rivet 62 passes in attaching the airgate 60 to the base 32, and a scoop-like sculptured portion 66. The base portion 64 is configured to be supported upon the base 32 employing a suitable bearing surface such as ball bearings 68 as are shown in FIG. 3. While these ball bearings typically ride in a bearing race 67 or the like, the details of the particular bearing surface have been omitted, being within the ordinary expertise of one skilled in the art.

It is important to note that the base 32 is not rotational. That is the base 32 remains fixed in position and does not rotate with the blades 28 and the shaft 22. The airgates 60 being fixed to the base in rotational relationship also do not provide a windmill powering function as might be expected with airgate-like structures mounted upon a turbine, for example. Instead the airgates 60 in the invention function to admit or deny admission of air flow through the airgates 60 to the center zone 69 of a central housing 70 defined by the base 32 and the airgates 60 together. A portion 72 of the scoop-like structure 66 of the airgate 60 functions to open the airgate 60 for the admission of airflow therethrough, and the portion 72 is thereby configured desirably to capture the wind, utilizing the captured wind to initiate opening of the airgate 60.

As may be seen best in FIG. 2, the admitted airflow to the housing 69 is captured by the portions 36, 38 of the blades 28, while in those zones of the housing 69 wherein the airgates 60 are closed, a wind flow within the housing 69 inhibits only to a minor extent the movement of the blades 28 during recovery to the power delivery position; the blades as depicted in FIG. 1 rotate in a counterclockwise direction. In viewing FIG. 1, it may be seen that the airgates 60 may be closed, open, or partially open depending upon the location of the airgate 60 about the circumference of the base 32, and the direction of the wind 53 impinging upon the airgates 60.

Referring to FIG. 2, it may be seen that while the blade 28 is in the power delivery position, the blade portion 38 protrudes above the airgates 60 thereby being positioned to capture airflow passing over the windmill 20 above or outside the confines of the housing 69. While the blade 28 is in the recovery position, the blade portion 38 does not protrude above the airgates 60 and the closed airgates 60 are thereby positioned to effectively shield the blade 28 against windflow tending to inhibit or slow blade 28 recovery.

Turning now to an alternate preferred embodiment of the invention, FIGS. 8–17 represent a windmill 20 in accordance with the invention. In FIGS. 8–17 like reference numerals refer to equivalent or like parts to those depicted in FIGS. 1–7.

A power delivery shaft 22 is provided. The power delivery shaft in joined for rotation with a connector block 24. The shaft 22 may be integral with the block 24 or may be joined thereto by suitable or conventional means such as welding, pins, splines, keyways, and the like.

Four blades 28 are provided. The blades are organized into pairs 29, 29′ with blade members of each pair being positioned 180° one across from the other. Each blade 28 is joined to a shaft portion 80, 81, 82, 83. Joinder can be effectuated by suitable or conventional means such as by crimp joints, screws, splines, keyways, interference fit and the like.

The shaft portions 82, 83 extend through and are supported by the block 24 at the bearing surfaces 92, 93 in FIG. 17 in suitable or conventional manner such as by bearing or bushing. As extended through the block 24, these shaft portions 82, 83 actually define one continuous shaft. Collars 110 function to forstall shaft travel through the block 24.

Referring to FIG. 17, it may be seen that the shaft portions 83, 82 are formed from a continuous piece of tubing, pipe, or the like. A cable 84 functions to forstall blades 28 being thrown from the windmill 20 in the event that a shaft 82, 83 failure occurs.

The shaft portions 80, 81 are supported by a block 96. This block 96 is retained in the block 24 by the shaft defined by 82, 83. The block 24, has a bore 98 therethrough defining the bearing surfaces 92, 93 and configured to receive the shaft defined by the portions 82, 83 and accommodate rotational motion of the block 96 as the blades 28 retained to the shafts 80, 81 raise and lower, A bearing surface 90 as shown in FIG. 10 supports the block 96 within the block 24. Pins 91 function to retain the shaft portions 80, 81 to the block 96 and to drive the block 96 for rotation. The pins 91 also accommodate a cable 84 functioning similarly to that associated with the shaft portions 82, 83. Assembly is accommodate by affixing the shafts 80, 81 to the block 96 using pins 91 and then inserting the block 96 into an appropriate bore defining the bearing surface 90, the shaft defined by 82, 83 being thereafter inserted through the bore 98.

The block 96 includes an aperture 97 which is formed by a pair of bores in the same plane separated in orientation by approximately 60°. This arrangement permits the block 96 to accommodate the shaft portions 82, 83 during rotation of the block 96.

The blades 28 each include an upper 36 and a lower 38 blade portion. The blades 28 as attached to the shaft portions 80, 81, 82, 83 pivot from a power delivery position shown generally at 100 to a recovery position 101 as the windmill 20 rotates in a counterclockwise manner as viewed in FIG. 8. For the blades 28 paired 29′ by attachment to the shaft portions 82, 83, which actually represent portions of a continuous shaft, the movement of one blade 28 of the pair 29′ from a recovery 101 position to a power delivery position 100 functions to assist in lowering the other blade 28 of the pair 29′ to the recovery position 101 by dint of both blades 28 in the pair 29′ being attached effectively to the same shaft.

For the pair 29 of blades 28 attached to the shaft portions 80, 81, the same co-operative function exists. The shaft portions 80, 81 are joined by the pins 91 to the pivot body 96 whereby the blades 28 of the pair 29 attached to these shaft portions 80, 81 are joined positively for rotation. Accordingly movement of a blade attached to one of the shaft portions 80, 81 from the recovery 101 to the power delivery 100 position assists in moving the other blade 28 of the pair 29 from the power delivery position 100 to the recovery position 101.

Referring to FIG. 11, an optional engagement element 110 is depicted affixed to the shaft 82 in suitable or conventional manner such as by employing keys 112 received in keyways 114 in the shaft 82 and the engagement element 110. The engagement element 110 includes an ear 116, with the ear 116 being configured to engage a power delivery piston 118. The power delivery piston can be of suitable or conventional nature well known in the hydraulic arts configured to deliver a quantity of fluid under pressure, upon being displaced from an "up" position as shown in FIG. 11 to a "down" position as shown in FIG. 12. Movement of the piston 118 from the up position to the down position is configured in well known manner to deliver a quantity of fluid under pressure through a tube 120 to the next most advanced piston 118 in a direction of rotation of the windmill 20, in the embodiment of FIGS. 9-15, counter-clockwise.

Referring to FIGS. 12 and 13, the engagement means 110 and piston 118 arrangement is depicted for various positions of the blades 28 about the rotational circumference of the windmill 20 blades 28. FIG. 13 represents a position of a blade 28 attached to a shaft 80 just approaching a full power delivery position 100 whereupon the engagement means 110 is being pressed towards a down position by the ear 116 of the engagement means 110. Fluid under pressure resulting from such compression as passed through the tubing 120 to the piston 118 as depicted in FIG. 12 which presses upwardly under the influence of this fluid under pressure against the ear 116 of the engagement means 110 as shown in FIG. 12 to assist in moving the blade associated with the shaft 83 in FIG. 12 from the power delivery position 100 to the recovery position 101. The ear 116 in FIG. 11 is positioned as might be found in a blade 28 associated with the shaft 82 just beginning elevational motion from the recovery position 101 to the power delivery position 100.

FIG. 14 depicts a check valve 130 configuration suitable for use in preventing back-flow of the fluid under pressure from one piston 118 to the next in a clockwise direction or opposite direction to the direction of rotation of the windmill 20 as depicted in FIGS. 8-15. Referring to FIG. 15, an expanded view of the check valve 130 is depicted including a rubber body 132, tubing 120a joining the check valve 130 to the next rearmost piston 118 in a direction of rotation of the windmill 20, and tubing 120b joining the check valve 130 to the next forward piston 118 in a direction of rotation of the windmill 20. A flapper 138 is provided configured to pivot between a position shown in solid lines in FIG. 15 and a position shown by dashed lines in FIG. 15 to control the flow of fluid under pressure as is appropriate. It is important to note that the flapper is positioned with respect to the direction of rotation of the windmill 20 whereby the inertial forces present in the fluid associated with the pistons 118 and the check valves 130 as a result of windmill rotation will tend to force the flapper 138 towards the position shown by dashed lines in FIG. 15 absent a flow of fluid from the tubing 120a.

Referring to FIG. 18, lifting action on a blade 28 upper portion 36 is depicted. The force of impinging wind is depicted by force line 202 and produces a lifting force depicted by force line 204 normal to the blade portion 36 lower surface 210. This lifting force 204 is opposed by the force line 206 representing appropriate components of the gravitational force and any tension in the line 42 (FIG. 5 and acting only when the blade portions are fully opened one from the other) normal to the blade portion 36 upper surface 208. When 204 exceeds or equals 206, the blade is lifted and powered.

Referring to FIG. 19 a lifting circle 211 is depicted. When a blade 28 is in an arc portion 212 of the circle 211, the wind force 204 lifts the blade by vertical action principally. When a blade 28 is in an arc portion 214 of the circle 211, the wind force 204 lifts and powers the blade by horizontal action principally. It is in arc circle 214 that the blade is powered most efficiently. When a blade 28 is in arc portion 216, the wind force 204 is no longer fully able to maintain the blade 28 in an elevated position. When a blade 28 is in arc portion 218, the wind force 204 exerts no significant lifting force on the blade from the standpoint of the practice of the invention.

Referring to FIG. 20a, action of the wind force 204 is depicted while a blade 28 is in the arc portion 212. The wind flow 53 divides into streams 220 and 222, of which 220 acts to lift the blade upper portion 36 by building pressure therebeneath while the stream 222 passes thereover. Referring to FIG. 20b, action of the wind force 204 is depicted while a blade 28 is in the arc portion 214 of the circle 211. The wind flow 53 impacts the blade 28 upper portion 36 as a stream depicted by the reference numeral 224 both in FIG. 20b and FIG. 2, the stream 224 provides power by flowing along the blade in a manner providing principally horizontal lifting.

The arc portion 212, 214, 216 can be adjusted to be larger or smaller, one with respect to the other, by the appropriate selection of the quantity and density of fluid in the chambers 44, 46; the extent to which the bracket 30 supports the blade portion 38; the extent to which the airgates 60 are permitted to open; and the extent to which the upper blade portion 36 protrudes above the airgates 60 while in the recovery position, as well as other factors.

While a preferred embodiment of the invention has been shown and described in detail, it should be apparent that various modifications may be made thereto without departing from the scope of the claims that follow.

What is claimed is:

1. A windmill comprising:
   a power transfer shaft defining a vertical axis of rotation for the windmill with respect to the Earth's surface;
   a plurality of blades, the blades being power transferringly attached to the power transfer shaft and configured to pivot between a power delivery position and a recovery position about an axis generally perpendicular to the vertical axis as defined by the power transfer shaft;
   a non-rotating central housing configured to establish an outer pheriphery surrounding the power transfer shaft and blades, thereby defining a plenum;
   a plurality of airgates, the airgates being configured and attached to the central housing in a manner permitting pivoting action between a closed position whereby negligible airflow is admitted through the airgate to the central housing and an open position whereby non-negligible air flow is admitted to the central housing, the airgates further including an air dam portion configured to facilitate movement of the airgates from the closed to the open position under the impetus of a desired airflow;

the blades each having an upper and a lower portion with respect to the Earth's gravitation field, the upper blade portion being larger than the lower blade portion;

the blades being of a configuration whereby while the blade is positioned in the power delivery position, the lower blade portion thereof is configured and positioned to collect air flow entering the central housing through the airgates and to channel the airflow towards the axis upon which the blade pivots, the upper blade portion thereof being configured and positioned to collect air flow both entering the central housing through the airgates and passing over the windmill outside the central housing, and to channel the air flow so collected generally parallel to the axis upon which the blade pivots, the blade while in the power delivery position thereby defining and presenting a generally concave surface to air flow passing through the airgates and over the central housing;

the blades further being of a configuration whereby while the blade is positioned in the recovery position, the blade is configured to present a generally convex surface to air flow which may be present both within the central housing and flowing thereover, the upper and lower portions configured and positioned to conduct airflow generally away from the axis along which the blade pivots.

2. In the windmill of claim 1 each blade having at least one of the upper and lower portions including therein a fluid chamber and containing in the fluid chamber a liquid partially filling the fluid chamber, the upper and lower portions of each blade being configured for pivoting motion along the blade pivot axis, one with respect to the other, thereby defining and establishing the pivoting motion of the blade, and including a means for limiting the extent of pivoting motion of the blade portions one with respect to the other.

3. In the windmill of claim 2 each blade having both the upper and lower portions thereof including therein a fluid chamber and containing therein a liquid partially filling the sum of the volumes of the fluid chambers of the upper and lower portions of each blade, and each blade further including at least one fluid conduit means joining the chambers of the upper and lower portions of each blade and configured for transferring fluid between the upper and lower chambers of the upper and lower portions of each individual blade.

4. In the windmill of claim 1, the blades being associated in pairs the elements of each pair being positioned 180° apart in a plane established by the rotation of the windmill, and the blades of the pairs being interconnected whereby movement of a blade in a pair from the recovery position to the power delivery position applies a returning force to the other blade in the pair configured to assist said other blade in returning from a power delivery position to the recovery position.

5. In the windmill of claim 4, the interconnection being formed by a coupling joining two pairs of blades, the coupling including a coupling block having bores therethrough configured to receive and accommodate shafting joining the blades of each of the pairs, with blades in one pair being affixed to a shaft formed of two shaft portions joined by a block contained within the coupling block and having a bore therethrough of a size and configured for receiving a second shaft, and a second shaft to which the other pair of blades is affixed, passing through the bore in the block.

6. The windmill of claim 5, each shaft including a pair of engagement elements affixed adjacent to the coupling block and associated with each of the blades of each pair, a power delivery piston configured to engage each engagement element whereby upon rotation of a blade from the recovery position to the power delivery position, the engagement element activates the power delivery piston, and fluid interconnections configured to provide a fluid displaced by activation of the power delivery piston associated with a particular blade to the power delivery piston associated with the next foremost blade in the direction of rotation of the windmill whereby the power delivery piston associated with said next foremost blade is caused to move the engagement element associated with said next foremost blade to assist said next foremost blade in movement from the power delivery position to the recovery position.

7. The windmill of claim 6, the fluid being a hydraulic fluid-liquid, and the power delivery pistons being housed in cylinders including check valves configured to preclude fluid motion to a blade next rearmost in the direction of rotation of the windmill.

8. A windmill comprising:

a power transfer shaft defining a vertical axis of rotation for the windmill with respect to the Earth's surface;

a plurality of blades, the blades being power transferringly attached to the power transfer shaft and configured to pivot between a power delivery position and a recovery position about an axis generally perpendicular to the vertical axis as defined by the power transfer shaft;

a non-rotating central housing configured to establish an outer pheriphery surrounding the power transfer shaft and blades, thereby defining a plenum;

a plurality of airgates, the airgates being configured and attached to the central housing in a manner permitting pivoting action between a closed position whereby negligible airflow is admitted through the airgate to the central housing and an open position whereby non-negligible air flow is admitted to the central housing, the airgates further including an air dam portion configured to facilitate movement of the airgates the closed to the open position under the impetus of a desired airflow;

the blades each having an upper and a lower portion with respect to the Earth's gravitation field, the upper blade portion being larger than the lower blade portion;

the blades being of a configuration whereby while the blade is positioned in the power delivery position, the lower blade portion thereof is configured and positioned to collect air flow entering the central housing through the airgates and to channel the airflow towards the axis upon which the blade pivots, the upper blade portion thereof being configured and positioned to collect air flow both entering the central housing through the airgates and passing over the windmill outside the central housing, and to channel the air flow so collected generally parallel to the axis upon which the blade pivots, the blade while in the power delivery position thereby defining and presenting a generally concave surface to air flow passing through the airgates and over the central housing;

the blades further being of a configuration whereby while the blade is positioned in the recovery position, the blade is configured to present a generally convex surface to air flow which may be present both within the central housing and flowing thereover, the upper and lower portions configured and positioned to conduct airflow generally away from the axis along which the blade pivots;

each blade having at least one of the upper and lower portions including therein a fluid chamber and containing in the fluid chamber a liquid partially filling the fluid chamber, the upper and lower portions of each blade being configured for pivoting motion along the blade pivot axis, one with respect to the other, thereby defining and establishing the pivoting motion of the blade, and including a means for limiting the extent of pivoting motion of the blade portions one with respect to the other.

9. The windmill of claim 8, each blade having both the upper and lower portions thereof including therein a fluid chamber and containing therein a liquid partially filling the sum of the volumes of the fluid chambers of the upper and lower portions of each blade, and each blade further including at least one fluid conduit means joining the chambers of the upper and lower portions of each blade and configured for transferring fluid between the upper and lower chambers of the upper and lower portions of each individual blade.

10. A windmill comprising:
a power transfer shaft defining a vertical axis of rotation for the windmill with respect to the Earth's surface;
a plurality of blades, the blades being power transferringly attached to the power transfer shaft and configured to pivot between a power delivery position and a recovery position about an axis generally perpendicular to the vertical axis as defined by the power transfer shaft;
a non-rotating central housing configured to establish an outer pheriphery surrounding the power transfer shaft and blades, thereby defining a plenum;
a plurality of airgates, the airgates being configured and attached to the central housing in a manner permitting pivoting action between a closed position whereby negligible airflow is admitted through the airgate to the central housing and an open position whereby non-negligible air flow is admitted to the central housing, the airgates further including an air dam portion configured to facilitate movement of the airgates the closed to the open position under the impetus of a desired airflow;
the blades each having an upper and a lower portion with respect to the Earth's gravitation field, the upper blade portion being larger than the lower blade portion;
the blades being of a configuration whereby while the blade is positioned in the power delivery position, the lower blade portion thereof is configured and positioned to collect air flow entering the central housing through the airgates and to channel the airflow towards the axis upon which the blade pivots, the upper blade portion thereof being configured and positioned to collect air flow both entering the central housing through the airgates and passing over the windmill outside the central housing, and to channel the air flow so collected generally parallel to the axis upon which the blade pivots, the blade while in the power delivery position thereby defining and presenting a generally concave surface to air flow passing through the airgates and over the central housing;

the blades further being of a configuration whereby while the blade is positioned in the recovery position, the blade is configured to present a generally convex surface to air flow which may be present both within the central housing and flowing thereover, the upper and lower portions configured and positioned to conduct airflow generally away from the axis along which the blade pivots;

the blades being associated in pairs the elements of each pair being positioned 180° apart in a plane established by the rotation of the windmill, and the blades of the pairs being interconnected whereby movement of a blade in a pair from the recovery position to the power delivery position applies a returning force to the other blade in the pair configured to assist said other blade in returning from a power delivery position to the recovery position;

the interconnection being formed by a coupling joining two pairs of blades, the coupling including a coupling block having two bores therethrough configured to receive and accommodate shafting joining the blades of each of the pairs with blades in one pair being affixed to a shaft having two shaft portions joined by a block contained within the coupling block and having a bore therethrough of a size and configuration far receiving a second shaft, and a second shaft to which the other pair of blades is affixed, passing through the bore in the coupling block;

11. In the windmill of claim 10, each shaft including a pair of engagement elements one affixed adjacent to the coupling block and associated with each of the blades of each pair, a power delivery piston configured to engage each engagement element whereby upon rotation of a blade from the recovery position to the power delivery position the engagement element activated the power delivery piston, and fluid interconnections configured to provide a fluid displaced by activation of the power delivery piston associated with a particular blade to the power delivery piston associated with the next foremost blade in the direction of rotation of the windmill whereby the power delivery piston associated with said next foremost blade is caused to move the engagement element associated with said next foremost blade to assist said next foremost blade in motion from the power delivery position to the recovery position;

12. In the windmill of claim 11, the fluid being a hydraulic fluid-liquid, and the power delivery pistons being housed in cylinders and including check valves configured to preclude fluid motion to a blade power delivery piston next rearmost in the direction of rotation of the windmill.

* * * * *